United States Patent [19]

Mueller et al.

[11] 3,883,458
[45] May 13, 1975

[54] FLATTING AGENTS FOR COATINGS

[75] Inventors: Dietrich-Wolfgang Mueller, Dossenheim; Hans Klug, Frankenthal; Klaus Bronstert, Carlsberg; Lieselore Grah, Frankenthal, all of Germany

[73] Assignee: BASF Aktiengesellschaft, Ludwigshafen (Rhine), Germany

[22] Filed: Feb. 1, 1974

[21] Appl. No.: 438,796

[30] Foreign Application Priority Data
Feb. 2, 1973 Germany............................ 2305023

[52] U.S. Cl. 260/28.5 R; 260/28.5 A; 260/29.2 TN; 260/29.2 UA; 260/29.2 N; 260/878 R
[51] Int. Cl............................................. C08c 11/70
[58] Field of Search...... 260/28.5 R, 878 R, 28.5 A, 260/29.2 TN, 29.2 UA, 29.2 N

[56] References Cited
UNITED STATES PATENTS

| | | | |
|---|---|---|---|
| 2,987,501 | 6/1961 | Rieke et al..................... | 260/28.5 R |
| 3,177,270 | 4/1965 | Jones et al...................... | 260/28.5 R |
| 3,437,623 | 4/1969 | Heinselman et al. .......... | 260/28.5 R |
| 3,590,076 | 6/1971 | Heintselman et al. ......... | 260/28.5 R |

Primary Examiner—Melvyn I. Marquis
Attorney, Agent, or Firm—Johnston, Keil, Thompson & Shurtleff

[57] ABSTRACT

Flatting agents for coatings obtained by reacting a polyolefin wax (A) with a vinyl aromatic compound (B) and a copolymerizable $\alpha,\beta$-olefinically unsaturated dicarboxylic anhydride (C), optionally partially replaced by at least one $\alpha,\beta$-olefinically unsaturated monocaraboxylic acid, the molar ratio of (B) to (C) being from 0.7:1 to 1:0.7 and the sum of the weights of (B) and (C) being from 2 to 50 percent by weight of the weight of polyolefin wax (A). The reaction is carried out at temperatures of from 100° to 200°C, in the presence or absence of conventional free-radical polymerization initiators. The agents are particularly suitable for coatings containing organic solvents.

10 Claims, No Drawings

FLATTING AGENTS FOR COATINGS

The present invention relates to flatting agents for use in surface coatings and obtained by modifying polyolefin waxes with vinyl aromatic compounds and α,β-olefinically unsaturated dicarboxylic anhydrides at elevated temperatures.

Various classes of material have been used industrially as flatting agents for coatings, for example colloid-soluble aluminum and zinc compounds, waxes and chemically modified natural substances.

The flatting agents which are insoluble in the organic solvents used in the coatings usually require complicated pretreatment before they are incorporated in the coatings. Thus it is frequently necessary to cause them to swell and then to effect trituration of the swollen flatting agent with solvents in order to break them down to a fine state of subdivision.

German Pat. No. 1,059,134 describes the use of fine crystals of polyethylene for flatting. The very fine particle sizes required to give the desired flatting effect are obtained by precipitating the polyethylene from a solution in aromatic compounds (e.g. a 5 percent solution in xylene/toluene) by the addition of the other components of the coating and/or non-solvents, the precipitated polyethylene then being present in the form of microcrystals. A serious disadvantage of this method is the use of large amounts of flammable aromatic solvents, which restrict the scope of formulation and cause undue pollution of the atmosphere when evaporated.

Attempts have thus been made to add the polyolefins to the coatings in milled form (e.g. ground polypropylene as described in German Pat. No. 1,246,916). However, the ground particles cannot be distributed evenly throughout the coating and the resulting coatings produce useless films of coarse texture. Furthermore, the pulverized polyolefins tend to form irreversible agglomerates on storage.

It is an object of the present invention to provide flatting agents which may be produced in a simple and reproducible manner and which do not suffer from the above drawbacks.

This object is achieved, surprisingly, by using flatting agents consisting of polyolefin waxes which have been modified at elevated temperatures with vinyl aromatic compounds and maleic anhydride, some of which may, if desired, be replaced by α,β-olefinically unsaturated monocarboxylic acids, and have then been converted to a powder in the usual way.

The present invention relates to flatting agents for coatings which have been obtained by reacting polyolefin wax (A) with a vinyl aromatic compound (B) and a copolymerizable α,β-olefinically unsaturated dicarboxylic anhydride (C), some of which may be replaced by at least one α,β-olefinically unsaturated monocarboxylic acid, the molar ratio of (B) to (C) being from 0.7:1 to 1:0.7 and the total of (B) and (C) being from 2 to 50 percent by weight of the weight of polyolefin wax (A), said reaction having been carried out at temperatures of from 100° to 200°C in the presence or absence of conventional free-radical polymerization initiators.

We particularly prefer flatting agents which have been produced using polymers of ethylene and/or propylene having molecular weights of from 800 to 25,000 and more preferably from 2,000 to 20,000 as component (A), styrene as component (B) and maleic anhydride or a mixture of maleic anhydride and acrylic acid and/or methacrylic acid as component (C), the total of (B) and (C) being from 6 to 35 percent by weight of component (A).

The modified waxes of the invention may be converted to finely divided powders in a simple manner by conventional methods, and such powders may be blended dry with any coatings. Coatings containing the flatting agents of the invention are very stable and give uniform films showing low surface reflection. Satin-finish coatings are obtained when from 0.1 to 10 percent of wax powder, by weight of the solid binder, is stirred into the composition.

The other properties of the coatings are not impaired by the addition of the flatting agents of the invention.

The following comments relate to the components of the flatting agents of the invention.

A. Suitable polyolefin waxes are conventional polyolefin waxes, particularly waxes based on polypropylene, polyethylene, ethylene/propylene copolymers, ethylene/carbon monoxide copolymers and mixtures of said polymers. Preferred components (A) are waxes based on polypropylene and polyethylene and having molecular weights of from 800 to 25,000 and preferably from 2,000 to 20,000.

B. Suitable vinyl aromatic compounds (B) are for example substituted styrene such as vinyl toluene, 3-chlorostyrene and isopropenylbenzene and, preferably, styrene itself.

C. Particularly suitable copolymerizable α,β-olefinically unsaturated dicarboxylic anhydrides are those having 4 or 5 carbon atoms such as maleic anhydride, methyl maleic anhydride and itaconic anhydride, but preferably maleic anhydride. A portion, say up to 35 percent molar, of these anhydrides may be replaced by α,β-olefinically unsaturated dicarboxylic acids such as maleic acid, fumaric acid, itaconic acid, mesaconic acid and citraconic acid, and copolymerizable α,β-olefinically unsaturated monocarboxylic acids of from 3 to 5 carbon atoms such as acrylic acid and methacrylic acid or mixtures thereof.

Components (B) and (C) are conveniently used in a molar ratio of from 0.7:1 to 1:0.7 and preferably from 0.9:1 to 1:0.8 for modification of component (A).

Component (A) is conveniently modified with from 2 to 50 percent and preferably from 6 to 35 percent by weight of components (B) and (C) together, based on the weight of component (A).

The reaction of (A) with (B) and (C) is generally carried out at temperatures of between 100° and 200°C and preferably between 120° and 180°C. If desired, conventional free-radical polymerization initiators such as benzoyl peroxide, dicumyl peroxide and α,α'-azodiisobutyronitrile, may be included in the reaction mixture.

Suitable processes for the manufacture of such reaction products are described for example in German Published Applications DOS 2,108,749 and 2,023,154. Suitable modified waxes may also be prepared by the method revealed in German Patent Application No. P 23 03 745.8.

In the reaction of component (A) with components (B) and (C), the individual components may be added to the mixture in any desired order, but it has been advantageous to start by mixing component (A) with component (C), if necessary at an elevated temperature, and then to add component (B).

The modified polyolefin waxes are used in the present invention as flatting agents and may be converted to the desired pulverized state by usual methods. For example, they may be finely pulverized in a jet mill. Other suitable methods of producing a fine powder include atomization from the melt or precipitation from solution, followed by drying. In fact, all methods are suitable for producing a finely divided flatting agent of the invention which give an adequately fine powder, preferably one having a particle size of less than $10\mu$.

The flatting agents of the invention may be added in powder form to the coatings direct. Alternatively, they may be mixed with the coatings together with solvents, plasticizers and/or resin solutions or mixtures thereof, as is usual in the case of other flatting agents.

It is also possible to prepare pastes of the wax in plasticizers or resins or resin solutions, which pastes contain a high percentage of wax. Such pastes are indefinitely stable and may be added to the coating shortly before use.

The flatting agents of the invention may be used together with other substances conventionally employed in the surface coatings industry to provide special effects, for example ungrafted polyolefin waxes, natural waxes such as carnauba wax, and esters and/or amides of long-chain carboxylic acids, preferably those having from 10 to 30 carbon atoms.

Furthermore, combinations with inorganic flatting agents such as finely divided silicic acid, magnesium silicates and aluminum silicates may be of interest. In such combinations, the pulverized wax also acts as an antisettling agent.

The flatting agents of the invention are generally used in amounts of from 1 to 20 percent and preferably from 5 to 10 percent by weight of the solids content of the coating, the amounts of flatting agent used being governed by the flatting effect desired.

In so-called textured varnishes and crackle varnishes, the wax content may be raised to as much as about 30 percent.

The flatting agents of the invention are essentially suitable for all conventional coatings of the types generally containing organic solvents such as aliphatic and/or aromatic hydrocarbons, e.g. toluene, xylene, white spirit, mixtures of low boiling aliphatic hydrocarbons, alcohols, e.g. ethanol, isopropanol and butanol, esters, e.g. ethyl acetate, butyl acetate, methyl glycol acetate and ethyl glycol acetate, ethers, e.g. dimethyl glycol, diethyl glycol, propyl diglycol and butyl diglycol, ketones, e.g. acetone, methyl ethyl ketone, methyl isobutyl ketone and cyclohexanone, and/or water, and mixtures thereof.

The binders contained in the coatings in which the flatting agents of the invention may be advantageously used are also those commonly employed, for example amino resins such as urea, melamine or benzoguanamine/formaldehyde resins, which may or may not be etherified with alcohols or plasticized or elasticized by appropriate modification, alkyd resins and oil-modified alkyd resins, e.g. phthalate resins modified with linseed oil, castor oil or tallow oil, polyurethanes, e.g. combinations of masked or unmasked polyisocyanates, preferably diisocyanates or triisocyanates containing polyester polyols, polyether polyols or hydroxyl-containing polymers (e.g. DESMOPHEN/DESMODUR combinations of Farbenfabriken Bayer AG, Leverkusen or LUMITOL products by BASF), paint binders based on polymers, e.g. vinyl chloride copolymers such as vinyl chloride/vinyl isobutyl ether copolymers, such as the LAROFLEX brands of BASF, vinyl chloride/vinyl ester copolymers, e.g. vinyl chloride/vinyl acetate copolymers, (meth)acrylate copolymers, nitrocellulose in combinations with resins of all types such as acrylate resins (e.g. ACRONAL brands of BASF) and, if desired, mixtures of said binders.

The flatting agents of the invention are suitable both for clear coatings and for coatings containing, for example, conventional pigments such as titanium dioxide (rutile or anatase), zinc white, oxide pigments such as chromium yellow, HELIOGEN products, extenders such as $BaSO_4$, talcum, dolonite, silicic acid and magnesium and aluminum silicates.

Further processing of the coatings is effected by usual methods.

The coatings may contain additives such as are usually employed in the coatings industry, for example flow modifiers, soluble dyes, silicone oils, surfactants, pigment wetting agents such as soy lecithin, venting auxiliaries, thixotropic agents, catalysts, activators and agents for regulating the surface tension and electrical conductivity. The coatings are processed in the normal manner.

The flatting agents of the invention are distinguished over known flatting agents in that, in particular, they can be simply stirred into the coating to give a state of optimum dispersion therein and show no tendency to flocculation or agglomeration either alone or in combination with pigments and fillers. They themselves show no tendency to settle, and even act as antisettling agents on any other components of the composition showing a tendency to settle.

In the following Examples the parts and percentages are by weight.

EXAMPLE 1

Two-component coating (polar)

|  | Parts |
| --- | --- |
| Commercial elasticized urea/urethane resin, e.g. PLASTOPAL BT (manufactured by BASF) in ethanol (about 60% solids) | 100 |
| 2:1 ethanol/ethyl glycol | 38 |
| silicone oil A (manufactured by Bayer, Leverkusen) in toluene (1% solids) | 0.4 to 0.8 |
| finely dispersed silicic acid, e.g. AEROSIL 380 (manufactured by Degussa, Wolfgang) | 0.0 to 0.8 |
| polyethylene wax having a mol. wt. of from 2,000 to 20,000, grafted with 22.5% of an equimolar mixture of styrene and maleic anhydride at temperatures of from 120° to 180°C | 4 |
| 10% HCl in ethanol | 12 |

The coating is applied by spray-gun at a rate of from about 40 to 80 g/m². The film is surface-dry after about 30 minutes and articles thus coated may be stacked after about 2 hours. The film shows extremely low surface reflection and is hard, mar-resistant and flexible.

EXAMPLE 2

Single-component coating (semi-polar)

|  | Parts |
|---|---|
| nitrocellulose N 24 (butanol-moist) | 12 |
| plasticized urea/formaldehyde resin PLASTOPAL AT in butanol (60% solids) | 12 |
| plasticized urea/formaldehyde resin PLASTOPAL AW | 8 |
| ethyl glycol | 30 |
| toluene | 24 |
| butyl acetate | 50 |
| $H_3PO_4$ | 2 |
| polypropylene wax grafted with 20% w/w of an equimolar mixture of styrene and maleic anhydride | 2 |
| inorganic flatting agent, e.g. OK 412 (manufactured by Degussa, Wolfgang) | 0 to 2 |

The rate of application using a spray-gun or pouring machine is below 100 g/m². When the OK 412 is not included, the surface obtained has a deep satin finish, whilst the surface resulting from the use of OK 412 is dead flat. In both cases the surfaces are hard and mar-resistant. The film is surface-dry after about 15 minutes and articles thus coated may be packed after from 1 to 2 hours.

EXAMPLE 3

Resin coating (non-polar)

|  | Parts |
|---|---|
| air-drying alkyd resin, e.g. ALKYDAL L 67 (manufactured by Bayer, Leverkusen) in white spirit (60% solids) | 100 |
| Co/Pb/Mn drier (25% solids) | 2 |
| commercial antiskinning agent, e.g. LUAKTIN (manufactured by BASF) | 0.5 |
| white spirit | 50 |
| pulverized wax consisting of 25% w/w of poly-ethylene wax grafted with 40% w/w of an equimolar mixture of styrene and maleic anhydride 25% w/w of ethylene bis-stearamide and 50% w/w of polypropylene wax | 4 to 8 |
| OK 412 (manufacture by Degussa, Wolfgang) | 0.2 to 0.6 |

This coating is applied by brush or spray-gun and gives a hard, mar-resistant surface showing little reflection. It is surface-dry after about 1 hour and fully dry after 24 hours. In this case, the addition of OK 412 renders the coating thixotropic and has no flatting action.

We claim:

1. A surface coating containing as a flatting agent the product obtained by reacting
   A. a polyolefin wax having a molecular weight of 800 to 25,000 which is a polyethylene wax, a polypropylene wax or an ethylene/propylene copolymer wax, with
   B. a vinyl aromatic compound which is styrene or vinyl toluene and
   C. a copolymerizable α,β-olefinically unsaturated dicarboxylic anhydride of from 4 to 5 carbon atoms, at a molar ratio of (B):(C) of from 0.7:1 to 1:0.7 and a weight total of (B) plus (C) of from 2 to 50 percent by weight with reference to the weight of the polyolefin was (A) and at a temperature of from 100°C. to 200°C. in the presence or absence of a free-radical polymerization initiator.

2. A surface coating containing said flatting agent as claimed in claim 1, wherein the copolymerizable α,β-olefinically unsaturated dicarboxylic anhydride (C) is replaced to an extent of up to 35 percent molar by at least one α,β-olefinically unsaturated copolymerizable monocarboxylic acid of from 3 to 5 carbon atoms.

3. A surface coating containing said flatting agent as claimed in claim 1, wherein component (C) is maleic anhydride.

4. A surface coating containing said flatting agent as claimed in claim 1, wherein component (C) is replaced to an extent of up to 35 percent molar by acrylic acid or methacrylic acid.

5. A surface coating containing said flatting agent as claimed in claim 1, wherein the molar ratio of (B) to (C) is from 0.9:1 to 1:0.8.

6. A surface coating containing said flatting agent as claimed in claim 1 wherein the flatting agent is distributed in the coating as a fine powder.

7. A surface coating containing said flatting agent as claimed in claim 1 wherein said surface coating is based upon an organic solvent, water or mixtures thereof.

8. A surface coating containing said flatting agent as claimed in claim 7 wherein the coating contains as a binder a polymeric material selected from the group consisting of amino resins, alkyd resins, polyurethanes, polyethere polyols, vinyl chloride copolymers, acrylate copolymers, methacrylate copolymers, nitrocellulose and mixtures of said binders.

9. A surface coating containing said flatting agent as claimed in claim 8 wherein component (A) has a molecular weight of 2,000 to 20,000.

10. A surface coating containing said flatting agent as claimed in claim 9 wherein component (B) is styrene and component (C) is maleic anhydride of which 35 percent molar is replaceable with acrylic acid and/or methacrylic acid, the total of (B) and (C) being from 6 to 35 percent by weight of component (A).

* * * * *